(12) United States Patent
Kesiboyana et al.

(10) Patent No.: US 10,803,453 B1
(45) Date of Patent: Oct. 13, 2020

(54) SYSTEM, METHOD AND COMPUTER-ACCESSIBLE MEDIUM FOR RESOURCE CENTRIC AUTHORIZATION IN MULTI PARTNER ECOSYSTEM

(71) Applicant: Capital One Services, LLC, McLean, VA (US)

(72) Inventors: Satish Kesiboyana, Plano, TX (US); Nag Prajval Bindumalyam Chandrashekar, Little Elm, TX (US); David Gillam, The Colony, TX (US); Suresh Pandey, McKinney, TX (US); Hala Eli-Ali, Murphy, TX (US); Pedro Betancourt, McKinney, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/687,960

(22) Filed: Nov. 19, 2019

(51) Int. Cl.
  *G06Q 40/00* (2012.01)
  *G06Q 20/38* (2012.01)
  (Continued)

(52) U.S. Cl.
  CPC ......... *G06Q 20/3821* (2013.01); *G06F 9/547* (2013.01); *G06F 16/9017* (2019.01); *H04L 63/0853* (2013.01)

(58) Field of Classification Search
  CPC . G06Q 20/3821; G06F 16/9017; G06F 9/547; H04L 63/0853
  See application file for complete search history.

(56) References Cited

U.S. PATENT DOCUMENTS

| 2013/0086645 | A1* | 4/2013 | Srinivasan | H04L 63/0815 726/4 |
| 2016/0065555 | A1* | 3/2016 | Branden | H04L 63/0807 726/7 |

(Continued)

FOREIGN PATENT DOCUMENTS

| WO | WO-2016126690 A1 * | 8/2016 | G06F 21/6227 |
| WO | WO-2017196774 A1 * | 11/2017 | H04L 63/0815 |

(Continued)

OTHER PUBLICATIONS

Mena Meseha, "Microservices Authentication and Authorization Problems," //medium.com/tech-tajawal/microservice (Year: 2018).*

(Continued)

*Primary Examiner* — Alexander G Kalinowski
*Assistant Examiner* — William B. Bunker
(74) *Attorney, Agent, or Firm* — Hunton Andrews Kurth LLP (57) ABSTRACT

An exemplary system, method and computer accessible medium can include receiving an authorization token related to a customer(s), determining a client identification (ID) associated with the customer(s) based on the authorization token, and determining access to a microservices(s) based on the client ID. An application for a loan(s) from the customer (s) can be received based on the client ID and the loan(s) can be associated with an application ID(s). A further authorization token related to a further customer(s) can be received, a further client ID can be determined based on the further authorization token, a determination can be made as to whether the further client ID has access to the application, and access to the application can be granted to the further customer(s) if the further client ID is determined to have access to the application.

18 Claims, 11 Drawing Sheets

(51) Int. Cl.
*G06F 9/54* (2006.01)
*G06F 16/901* (2019.01)
*H04L 29/06* (2006.01)

(56) References Cited

U.S. PATENT DOCUMENTS

| | | | | |
|---|---|---|---|---|
| 2017/0331832 | A1* | 11/2017 | Lander | H04L 63/0815 |
| 2018/0018723 | A1* | 1/2018 | Nagla | G06Q 20/388 |
| 2018/0026984 | A1* | 1/2018 | Maker | H04L 67/10 726/4 |
| 2018/0027080 | A1* | 1/2018 | Yang | H04L 41/12 709/224 |
| 2018/0075231 | A1* | 3/2018 | Subramanian | H04L 63/0815 |
| 2018/0109429 | A1* | 4/2018 | Gupta | H04L 41/0893 |
| 2018/0115635 | A1* | 4/2018 | Ahuja | H04L 69/166 |
| 2018/0219846 | A1* | 8/2018 | Poschel | H04L 63/10 |
| 2018/0302391 | A1* | 10/2018 | Jones | H04L 63/083 |
| 2018/0309802 | A1* | 10/2018 | Sahu | H04L 61/106 |
| 2019/0042339 | A1* | 2/2019 | Doshi | G06F 9/45558 |
| 2019/0238598 | A1* | 8/2019 | Mohamad Abdul | H04L 65/1073 |
| 2019/0253424 | A1* | 8/2019 | Burckhardt | G06F 21/6218 |
| 2019/0273746 | A1* | 9/2019 | Coffing | H04L 9/3213 |

FOREIGN PATENT DOCUMENTS

| | | | | |
|---|---|---|---|---|
| WO | WO-2018053122 A1 | * | 3/2018 | H04L 63/0815 |
| WO | WO-2019200402 A1 | * | 10/2019 | H04W 12/1006 |

OTHER PUBLICATIONS

Arne Koschel et al., "Making the Move to Microservice Architecture," International Conference on Information Society (Year: 2017).*
Banati et al., "Authentication and Authorization orchestrator for microservice-based software architectures," MIPRO May 21-25, 2018, Opatija Croatia (Year: 2018).*
Bill Doerrfeld, "How to Control User Identity Within Microservices," https://nordicapis.com, (Year: 2018).*
"Microservices Authentication and Authorization Solutions", [retrieved on Jul. 19, 2018]. Retrieved from Internet URL: https://medium.com/tech-tajawal/microservice-authentication-and-authorization-solutions-e0e5e74b248a, 12 pages.
"Permissions between Different Microservices", webdev [retrieved on Jul. 23, 2018]. Retrieved from Internet URL: https://www.reddit.com/r/webdex/comments/8xnnlr/permissions_between_different_microservices/, 4 pages.
Ali M. et al, "Starting Development of Container and Cloud-based Applications Using Red Hat JBoss Developer Studio", Red Hat JBoss Developer Studio 10.2, 64 pages.
"Row Level Access in a Monolith Application and in Microservices Based Application", Software Engineering Stack Exchange [retrieved on Jul. 20, 2018]. Retrieved from Internet URL: https://softwareengineering.stackexchange.com/questions/354687/, 4 pages.

* cited by examiner

Client Configuration Table

| Client_ID | Client_Alias_Name | Client_Config |
|---|---|---|
| DN10704c853d4 | DN | { "clientGroups" : ["COF_MP"] } |
| AN2hj9kj85533e | AN | { "clientGroups" : ["COF_MP"] } |
| COFhj9kj85534z | COF | { "clientGroups" : ["COF_LN"] } |
| 360hj9kj85534z | 360 | { "clientGroups" : ["COF_LN"] } |
| RC5hj9kj85535q | RC | { "clientGroups" : ["COF_LN"] } |

Figure 4A

Client Grouping Table

| Group_Id | Group_Type | Clients |
|---|---|---|
| COF_MP | Marketplace | AN, DN |
| COF_LN | Lender | COF, 360, RC |

Figure 4B

Applications Table (REST Resource)

| Application_Id | Client_Alias_Name | Application_Detail |
|---|---|---|
| App_ID_1 | AN | { "app1": "..." } |
| App_ID_2 | DN | { "app2": "..." } |

Figure 4C

Appl Offers Table (REST Resource)

| Application_Id | Offer_Id | Client_Alias_Name | Offer_Detail |
|---|---|---|---|
| App_ID_1 | Offer_ID_1 | AN | { "ofr1": "..." } |
| App_ID_1 | Offer_ID_2 | AN | { "ofr2": "..." } |
| App_ID_2 | Offer_ID_3 | DN | { "ofr3": "..." } |

Figure 4D

Sequence of actions

| Client ID | Action | | Result | | |
|---|---|---|---|---|---|
| AN2hj9kj85533e | POST | applications {body} | App_ID_1 | 201 | Created |
| AN2hj9kj85533e | GET | App_ID_1 | App_ID_1 {appDetails} | 200 | Returned |
| DN10704c853d4 | PUT | App_ID_1 | App_ID_1 | 200 | Updated |
| COFhj9kj85534z | GET | App_ID_1 | Unauthorized | 401 | |
| DN10704c853d4 | POST | applications {body} | App_ID_2 | 201 | Created |
| AN2hj9kj85533e | GET | App_ID_2 | Unauthorized | 401 | |
| RC5hj9kj85535q | GET | App_ID_2 | Unauthorized | 401 | |
| AN2hj9kj85533e | GET | offers {App_ID_1} | Offer_ID_1 & Offer_ID_2 | 200 | |
| DN10704c853d4 | GET | offers {App_ID_1} | Offer_ID_1 & Offer_ID_2 | 200 | |
| AN2hj9kj85533e | GET | offers {App_ID_2} | Unauthorized | 401 | |

SYSTEM, METHOD AND COMPUTER-ACCESSIBLE MEDIUM FOR RESOURCE CENTRIC AUTHORIZATION IN MULTI PARTNER ECOSYSTEM

FIELD OF THE DISCLOSURE

The present disclosure relates generally to micro services, and more specifically, to exemplary embodiments of an exemplary system, method, and computer-accessible medium for resource centric authorization in a multi partner ecosystem.

BACKGROUND INFORMATION

Microservices, also known as the microservice architecture, is an architectural style that structures an application as a collection of services that are highly maintainable and testable, loosely coupled, independently deployable, and organized around business capabilities. The microservice architecture enables the continuous delivery/deployment of large, complex applications. In a microservice architecture, services are fine-grained and the protocols are lightweight. The benefit of decomposing an application into different smaller services is that it improves modularity. This makes the application easier to understand, develop, test, and become more resilient to architecture erosion. It also parallelizes development by enabling small autonomous teams to develop, deploy and scale their respective services independently. Further, it also allows the architecture of an individual service to emerge through continuous refactoring.

While microservices allow for lightweight, customizable applications, traditional methods for granting permission and authentication can be difficult. In some microservice-based systems, permissions are handled using OAuth. OAuth (e.g., Open Authorization) is an open standard for token-based authentication and authorization on the Internet. OAuth allows an end user's account information to be used by third-party services, without exposing the user's password. OAuth acts as an intermediary on behalf of the end user, providing the service (e.g., the microservice) with an access token that authorizes specific account information to be shared. The process for obtaining the token is called a flow. However, a problem with OAuth is that it is a delegated authorization protocol, and may not be suitable for fine-grained policy-based or role-based authorization.

Thus, it may be beneficial to provide an exemplary system, method, and computer-accessible medium for resource centric authorization in multi partner ecosystem which can overcome at least some of the deficiencies described herein above.

SUMMARY OF EXEMPLARY EMBODIMENTS

An exemplary system, method and computer accessible medium can include receiving an authorization token related to a customer(s), determining a client identification (ID) associated with the customer(s) based on the authorization token, and determining access to a microservices(s) based on the client ID. An application for a loan(s) from the customer (s) can be received based on the client ID and the loan(s) can be associated with an application ID(s). A further authorization token related to a further customer(s) can be received, a further client ID can be determined based on the further authorization token, a determination can be made as to whether the further client ID has access to the application, and access to the application can be granted to the further customer(s) if the further client ID is determined to have access to the application.

In some exemplary embodiments of the present disclosure, the determination can be made as to whether the client ID has access to the application based on a lookup table. The lookup table can include (i) a plurality of rows associated with a plurality of customers including the customer(s) and (ii) a plurality of columns with resources available to each of the customers. The resources can include (i) creating an application, (ii) revising the application or (iii) checking a status of the application. The authorization token can be an open authorization (oAuth) token, and the oAuth token can be generated using an oAuth server. An application programming interface header can be modified to include the client ID. The customer(s) can be an automobile dealer or a money lender. The microservice(s) can include (i) an applications microservice, (ii) an offers microservice, or (iii) a vehicle pricing microservice.

Additionally, an exemplary system, method and computer-accessible medium can include, receiving (i) an authorization token related to a customer(s) and (ii) an application for an automobile loan related to the customer(s), determining a client identification (ID) associated with the customer(s) based on the authorization token and modifying an application programming interface (API) header to include the client ID, determining if the client ID has access to an application microservice based on the API header, providing the application to the application microservice, receiving a request for access to the application from a further customer(s), determining if the further customer(s) has access to the application based on a further client ID associated with the further customer(s), and granting access to the application at the application microservice to the further customer(s) based on the further client ID.

In some exemplary embodiments of the present disclosure, a further authorization token related to the further customer(s) can be received and the further client ID can be determined based on the further authorization token. A determination can be made as to whether the client ID has access based on a lookup table. The lookup table can include (i) a plurality of rows associated with a plurality of customers including the customer(s) and (ii) a plurality of columns with resources available to each of the customers. The resources can include (i) creating an application, (ii) revising the application or (iii) checking a status of the application. The authorization token can be an open authorization (oAuth) token, and the oAuth token can be generated using an oAuth server. The application microservice can be called using the API header. The customer can include an automobile dealer or a money lender. The determination of if the further customer(s) has access to the application can be made by determining if an entry in a lookup table includes information regarding the further customer(s).

Further, an exemplary system, method, and computer-accessible medium can include receiving an authentication request at an open authorization server from a client, generating a token based on the authentication request, providing the token to an application programming interface (API), validating the access token at the API, obtaining a client identification (ID) based on the access token, and determining if the client has access to a particular resource in a microservice based on an entry in a lookup table associated with the client ID.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which:

FIGS. 5A-7 are exemplary flow diagrams of methods according to an exemplary embodiment of the present disclosure.

DETAILED DESCRIPTION OF EXEMPLARY EMBODIMENTS

The exemplary system, method, and computer-accessible medium, according to an exemplary embodiment of the present disclosure, can include permissions for use in a microservice. With a microservice, applications are broken down into their smallest components, which can be independent from each other. Instead of a traditional, monolithic, approach to apps, where everything is built into a single piece, microservices can be separated, but can function together to accomplish the same tasks. Each of these components, or processes, is a microservice. In order to facilitate permissions for each microservice, the exemplary system, method, and computer-accessible medium can provide a tabular, permission-based, access to specific microservices. Thus, limiting access to information to only those with specific authorization.

Figure 1:
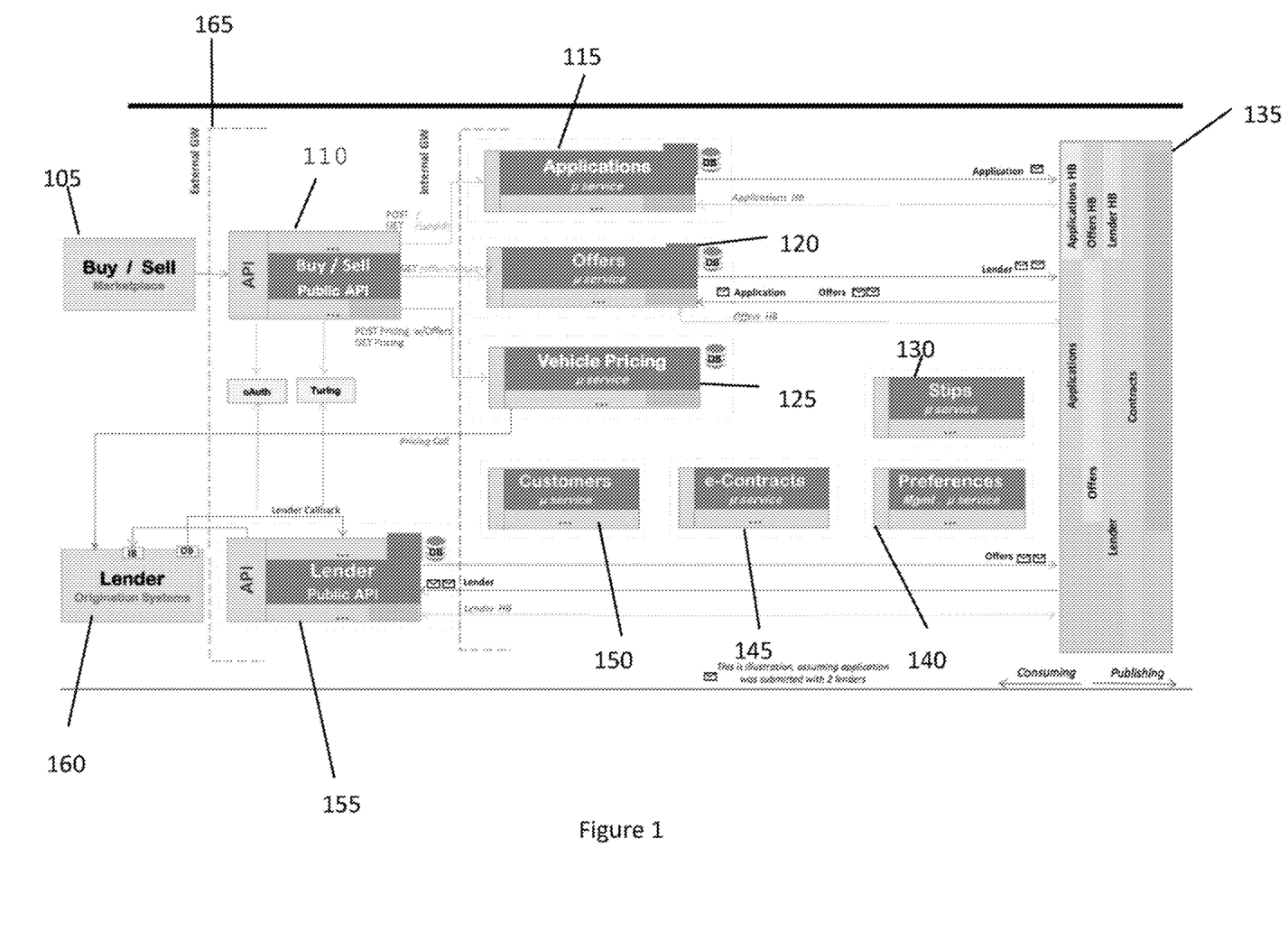
FIG. 1 is an exemplary schematic diagram of an Auto Management Platform architecture according to an exemplary embodiment of the present disclosure.

FIG. 1 is an exemplary schematic diagram of an Auto Management Platform ("AMP") architecture according to an exemplary embodiment of the present disclosure, which can facilitate loan applications for the purchase of a car. For example, as shown therein, Buy/Sell marketplace 105 can be an interface for applying for a loan for a car. Buy/Sell marketplace 105 can include dealerships (e.g., virtual dealerships located on the internet or physical dealerships). Buy/Sell marketplace 105 can include multiple lead generators (e.g., leads for auto loan applications) where a customer can interface with the marketplace to indicate that they are interested in buying the car. The interest can include the car to be purchased (e.g., which can include an average sale price), a price to be paid by the user, or an overall inquiry regarding the total loan available to the user, which the user can then use to select a car. This information can be used to provide the user with various exemplary financing options available to the user. Buy/Sell marketplace 105 can be a public interface for the user. Alternatively, Buy/Sell marketplace 105 can be located and accessed only by a dealer.

AMP architecture can also include a lender origination system 160. Lender origination system 160 can include multiple lenders who may be able to finance the car for the prospective customer. Thus, the exemplary AMP can facilitate a transaction between buy/sell marketplace 105 and lender origination system 160. Both buy/sell marketplace 105 and lender origination system 160 can be microservices, can be publicly accessible, and can access the AMP through an external gateway. Line 165 located next to Buy/Sell marketplace 105 can indicate an external gateway, which can provide Buy/Sell marketplace 105 and lender origination system 160 with access to the AMP. Since buy/sell marketplace 105 and lender origination system 160 are microservices, each of which is specialized, access (e.g., permissions) provided to buy/sell marketplace 105 and lender origination system 160 can be difficult to manage. The exemplary system, method, and computer-accessible medium, according to an exemplary embodiment of the present disclosure, can facilitate permission-based access by both buy/sell marketplace 105 and lender origination system 160.

Based on the above, for example, a customer can go to a dealer and indicate that they are interested in purchasing a car. The financing department at the dealer can use buy/sell marketplace 105 to determine whether the customer is prequalified, and the details of the prequalification (e.g., what kind of car the customer can afford). During such discussion, the financing department can receive an application from the customer and provide it to the buy/sell marketplace 105, which can input the information into the AMP. Information in the application can be input into the AMP through buy/sell application program interface ("API") 110, and then an exemplary microservice (e.g., application microservice 115) can be used to indicate that a customer is interested in determining available financing options, which can include receiving available financing options from multiple lenders. Applications microservice 115 can review the information and send an event to an exemplary messaging system (e.g., messaging system 135), which can be used to provide the information to other microservices, and to receive an offer.

For example, an offer microservice 120 can listen for an event when a new application comes into the AMP. Offer microservice 120 can analyze the application and determine that this application will eventually have a particular number of offers, and then create a shell offer for the application. Offer microservice 120 can communicate with one or more Lender APIs (e.g., Lender API 155). Lender API 155 can be lender agnostic, capable of communicating with all available lenders. Alternatively, there can be multiple lender APIs, where each of the lenders has its own lender API. Communication from the offer microservice 120 can include pertinent information for a lender to prepare an offer for the customer.

Lender API 155 can provide the pertinent information to one or more lenders through lender origination system 160. Lender origination system 160 can be in communication with vehicle pricing microservice 125, which can include the particular price for an automobile selected by the customer. Once the lender origination system 160 completed the offer process, there can be a call-back that occurs from the lender 160 back to the AMP. Lender API 155 can determine that an offer has been made from Lender origination system 160. This offer can then be communicated over messaging system 135 back to offer microservice 120.

Offer microservice 120 can then provide the offers to buy/sell marketplace 105 through buy/sell API 110. The exemplary AMP can also include customers microservice 150, e-contracts microservice 145 (e.g., which can be used to generate lending contracts), a preferences microservice 140 (e.g., which can be used to set management preferences), and a stips microservice (e.g., which can be used to set stipulations).

The exemplary preferences microservice 140 can facilitate clients to manage preferences including, but not limited to, security, resource sharing, eligibility requirements and managing lender relationships. Utilizing such a microservice, clients can establish the rules on authorization (e.g., how Representational State Transfer resources can be shared across marketplace clients and the ability to read/update the resources by other marketplace clients).

The exemplary customers microservice 150 can provide a customer centric view to the AMP. This microservice can consume events from the applications microservice 115, the offers microservice 120, and the vehicle pricing microservice 125, and can establish relationships among relevant events to provide customer centric view of all the applications, offers, and pricing offers initiated and received by the customer.

The exemplary AMP can utilize any suitable authentication procedure including, but not limited to, OAuth for authentication with all of the exemplary microservices. For example, when an interested party (e.g., auto dealer or lender) subscribes to an exemplary API product suite, they can implement OAuth. OAuth can verify a particular client, and clients can be provided with identifying credentials (e.g., a unique client identification ("ID")). Every time there is API interaction with a customer (through a public API) the OAuth server can be used to authenticate the customer/client. An exemplary token can then be provided after authentication.

Figure 2:
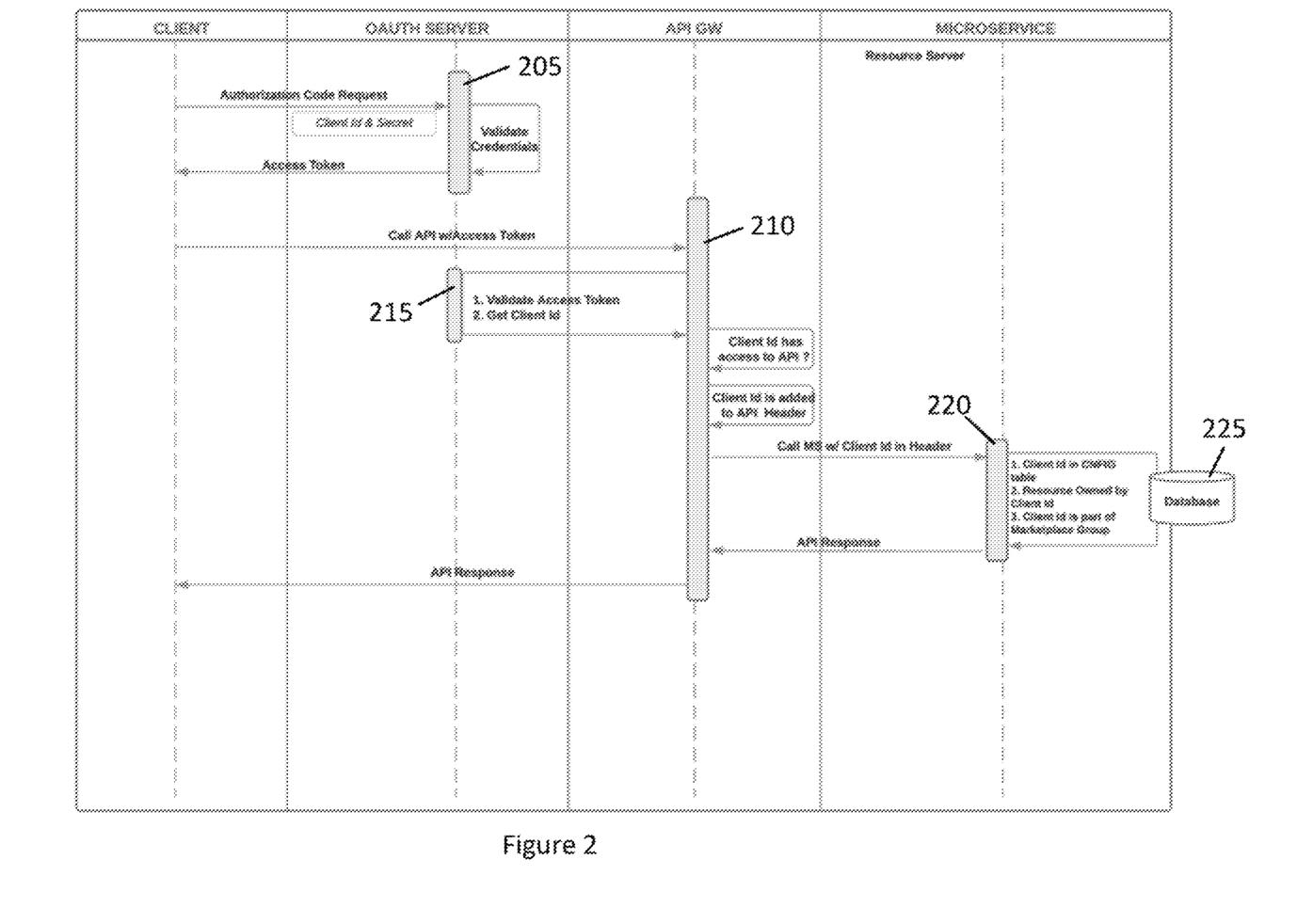
FIG. 2 is an exemplary diagram of an authorization API according to an exemplary embodiment of the present disclosure.

FIG. 2 shows a diagram of an authorization API according to an exemplary embodiment of the present disclosure. As discussed above, every authorized client can be issued a client ID and a client secret for their API to interact with the AMP. When a client initially accesses the API, the client sends a client ID and client secret to the OAuth server, and the OAuth server reviews the credentials, and validates the client. After a successful validation, the client is provided with an access token. For example, as shown in FIG. 2, an authorization request can be sent to a server 205 (e.g., an OAuth server), which can be used to validate the credentials. After the credentials are validated, and access token is provided.

After receiving an access token, an API 210 can be called with the access token. API 210 can validate the access token using a validation server 215. If the access token is validated, then a client ID can be obtained (e.g., determined) and provided back to API 210. The client can also use the token for all the subsequent API transactions between the client and API 210. If the client is a new client, then a new client ID can be generated once the token is validated. Access to particular microservices can be assigned at this time, and this information can be stored in a lookup table. If the client is not a new client, then the client ID associated with the oAuth token can be used to determine access by the client. In particular, a determination can be made as to whether the client ID has access to the API 210. If the client ID has access to the API 210, then the client ID can be added to an API header, which can be sent back to the AMP. The client ID can then be provided to Microservice 220. Microservice 220 can lookup the client ID in a table (e.g., a CNFG table), and determine the resource owned by the client ID. For example, Microservice 220 can determine if the client ID is part of a particular group (e.g., a marketplace group), which can be used to provide access to certain information in database 225 that is associated with the particular group (e.g., based on the permissions discussed below). Thus, when an application is being created, a client ID can be added to an exemplary configuration table, as will be discussed below. The client ID that is generated or obtained can be used for all access determinations for the particular client.

Figure 3:
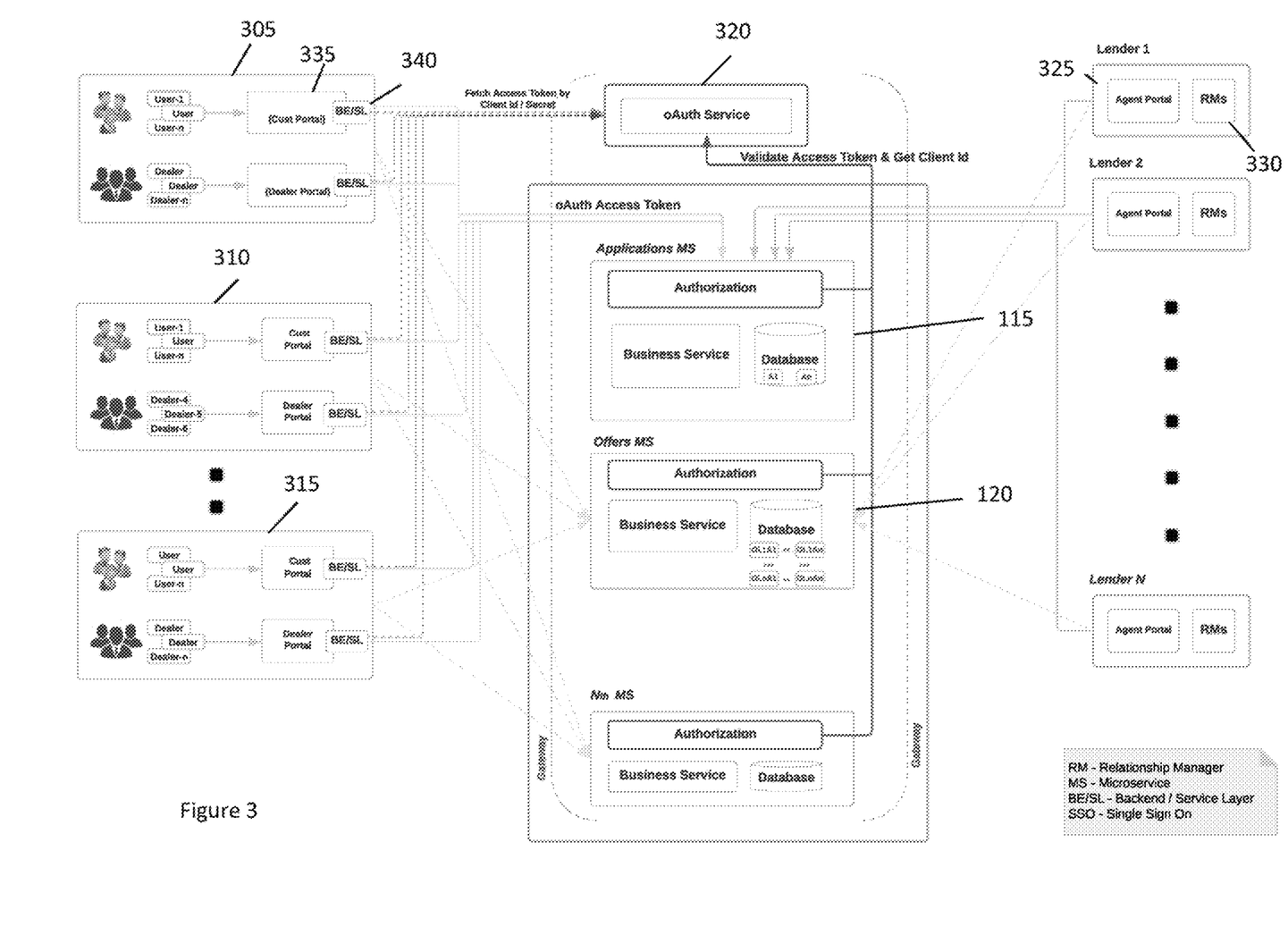
FIG. 3 is an exemplary diagram of a multi partner ecosystem according to an exemplary embodiment of the present disclosure.

FIG. 3 shows an exemplary diagram of a multi partner ecosystem according to an exemplary embodiment of the present disclosure. For example, as shown in FIG. 2, various lead generators 305, 310, and 315 (lead generators from the different clients) can provide leads to the exemplary AMP. Lead generators 305, 310, and 315 may include any lead generating entity, such as one that may be associated with an automobile searching or purchasing platform, such as a lender, a dealership, or aggregator, for example. Various lenders (e.g., lender 1, lender 2, lender N, etc.) can provide lending for an automobile. Each lender can include an agent portal or another portal where a relationship manager 330 can interact or make changes to an application, or work with a specific financing deal that was generated as a result of an inaccessible application submission. Each lead generator can include portal website 335, which can be a customer portal for submitting an application. A handshake can be performed between a back end application 340 and oAuth service 320. oAuth service 320 can provide access to application microservice 115, which can use offer microservice 120, to gain access to lenders 325, who in turn can provide lending offers to the customer. While only three lead generators are shown, there can be significantly more lead generators, and significantly more lenders, which can make it difficult to keep track of the various authorizations for each microservice. The exemplary system, method and computer-accessible medium can be used to determine various permissions for different actors (e.g., customer, dealer, lender etc.) For example, the exemplary system, method and computer-accessible medium can be used to ensure that a customer can access their own application and that the original dealer can access the customer's application and the offer. Additionally, the exemplary system, method and computer-accessible medium can ensure that the Lender who has generated this offer for this application, can access the offer.

FIGS. 4A-4E are exemplary tables used for permission access according to an exemplary embodiment of the present disclosure. Every client who has access to the AMP can have an entry into a client configuration table (e.g., the client configuration table shown in FIG. 4A), which can be based on the client ID. For example, a customer submitting an application can be provided with access, as well as the dealer associated with the customer. The client ID can include a unique series of numbers. Each client ID can include an indication identifying the client as a client type (e.g., ("DN") or ("AN")) based on a Client Alias Name, although other identifying characteristics can be used in the client ID. In particular, each user, whether a customer or an associated dealer can be provided with a client type (e.g., the customer can include the client type AN).

Figure 4A:
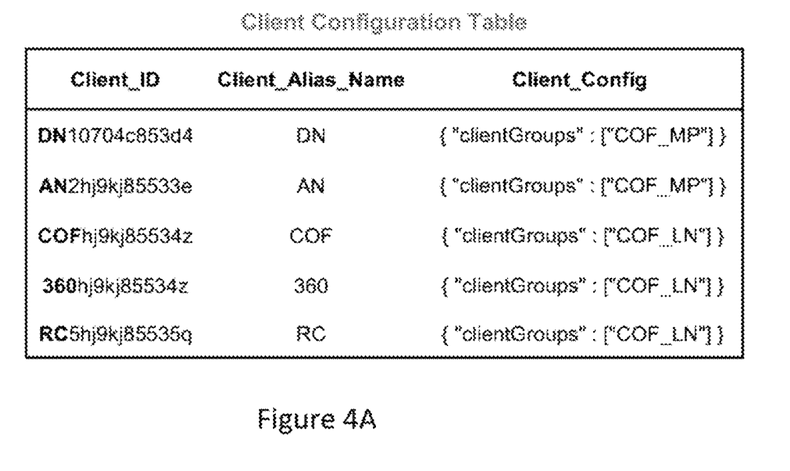
FIGS. 4A-4E are exemplary tables used for permission access according to an exemplary embodiment of the present disclosure.
Figure 4B:
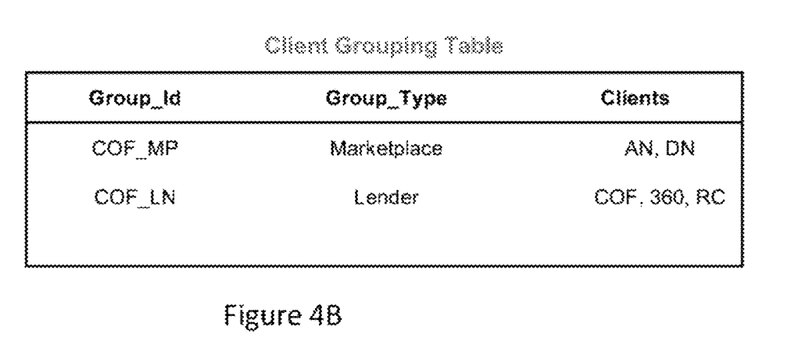

As shown in FIG. 4A, clients DN10704c853d4 and AN2hj9kj85533e are members of client group COF_MP under Client_Config. Clients COFhj9kj85534z, 360hj9kj85534z, and RC5hj9kj85535q are members of client group COF_LN. FIG. 4B shows a Client Grouping Table with the Group ID, the Group Type, and the Clients associated with that group type. As shown in FIG. 4B, clients, as identified by the Client Alias Names from FIG. 4A, can be members of the same group as identified by the group type (e.g., AN and DN can be members of the marketplace group type, and COF, 360, and RC can be members of the Lender group type) in order to determine which microservices can be accessible to each client. For example, clients in the same marketplace can be provided access to the same microservices.

Figure 4C:
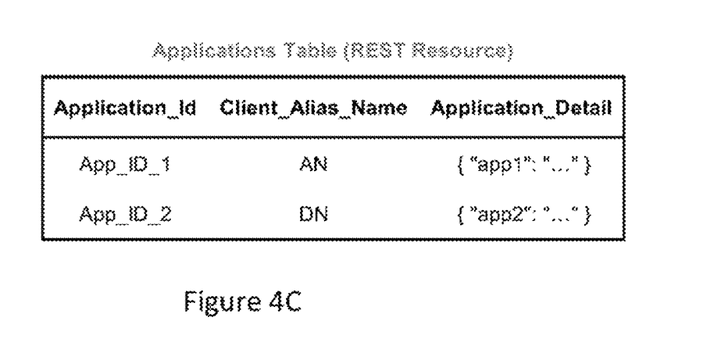
Figure 4D:
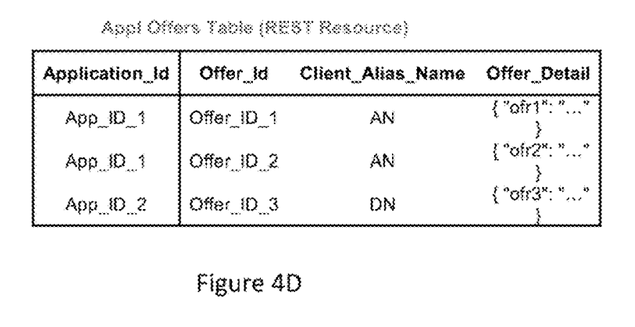

FIG. 4C shows an Application Table according to an exemplary embodiment of the present disclosure. Whenever a new application is received by AMP, an application ID can be created and a client ID can be associated with the application ID. For example, as shown in FIG. 4C, App_ID_1 has been generated which is associated with AN, and App_ID_2 has been generated which is associated with DN. FIG. 4D shows an Applications Offer Table according to an exemplary embodiment of the present disclosure. After an application has been received, and an application ID is associated with the application, any received offers can be associated with the application ID. For example, as shown in FIG. 4D, App_ID_1 has two offers associated with it (Offer_ID_1 and Offer_ID_2) and App_ID_2 has one offer associated with it (Offer_ID_3). Since App_ID_1 was associated with AN in the Applications Table (FIG. 4C), AN has access to Offer_ID_1 and Offer_ID_2. Further, since App_ID_2 was associated with DN in the Applications Table, DN has access to Offer_ID_3 in the Application Offers Table.

Figure 4E:
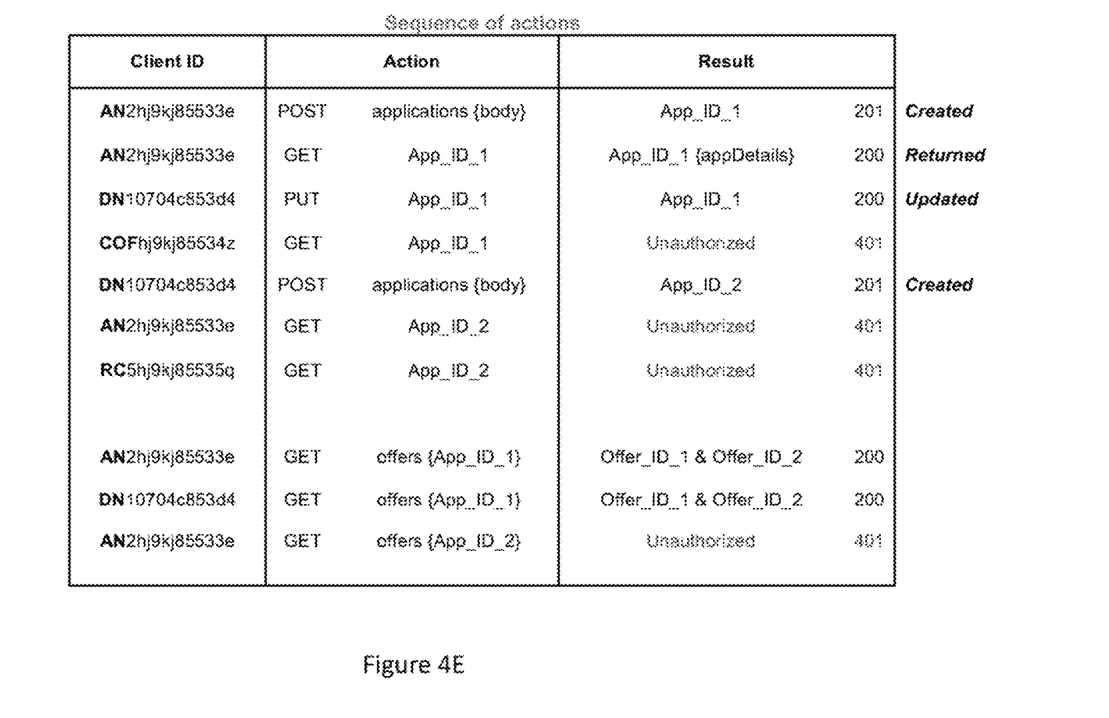

FIG. 4E shows a diagram illustrating a sequence of actions according to an exemplary embodiment of the present disclosure. As shown in FIG. 4E, AN creates an application through a post action, which results in an application ID of App_ID_1. AN can then review the status of APP_ID_1 through a get action. The exemplary system, method and computer-accessible medium can determine that AN has access to APP_ID_1 (e.g., using the Applications Table), and can provide the details and status of App_ID_1 to AN. DN can also be provided with access to App_ID_1. Thus, DN can update APP_ID_1 through a put action. However, other clients may not have access to App_ID_1, and they would be denied any actions performed on App_ID_1. For example, as shown in FIG. 4E, COF can request access to APP_ID_1 through a get action. However, since COF is not a member of the same group, COF is determined to be unauthorized, and is denied access to APP_ID_1 in a get action.

Since AN and DN are members, they may have access to some of the same microservices and some of the same application. However, in some exemplary embodiments of the present disclosure, AN may be prevented from accessing other resources that DN has access to. For example, as shown in FIG. 4E, DN can post a second application having application ID APP_ID_2. Both AN and RC can request access to APP_ID_2. However, both AN and RC will be denied as being unauthorized. Similar to the created applications, AN and DN can both access offers associated with APP_ID_1, but only DN can access offers associated with APP_ID_2.

Thus, as described above, the exemplary system, method and computer-accessible medium can facilitate authorization or access to each client using one or more an exemplary lookup tables, which can be created, and which can store the available resources for each client ID. For example, when a client is added into AMP, they can be assigned a client ID, which can have an associated Client Alias Name and Client Config (see e.g., Client Configuration Table shown in FIG. 4A). The Client Config can include a Group ID, which can be used in a Client Grouping Table (see e.g., FIG. 4B) to identify the group type, and all clients associated with a particular Client ID. As shown in FIG. 4C, applications can be created and can be give an Application ID in an Applications Table, which can be associated with particular clients. Offer can be stored in an Offers table, provides details regarding all offers, and their associated ID, and which clients have access to each offer. By providing such granular level detail for storing various clients, and permissions, the exemplary system, method and computer-accessible medium, according to an exemplary embodiment of the present disclosure, can facilitate fine grain control of the application and offer process.

Figure 5A:
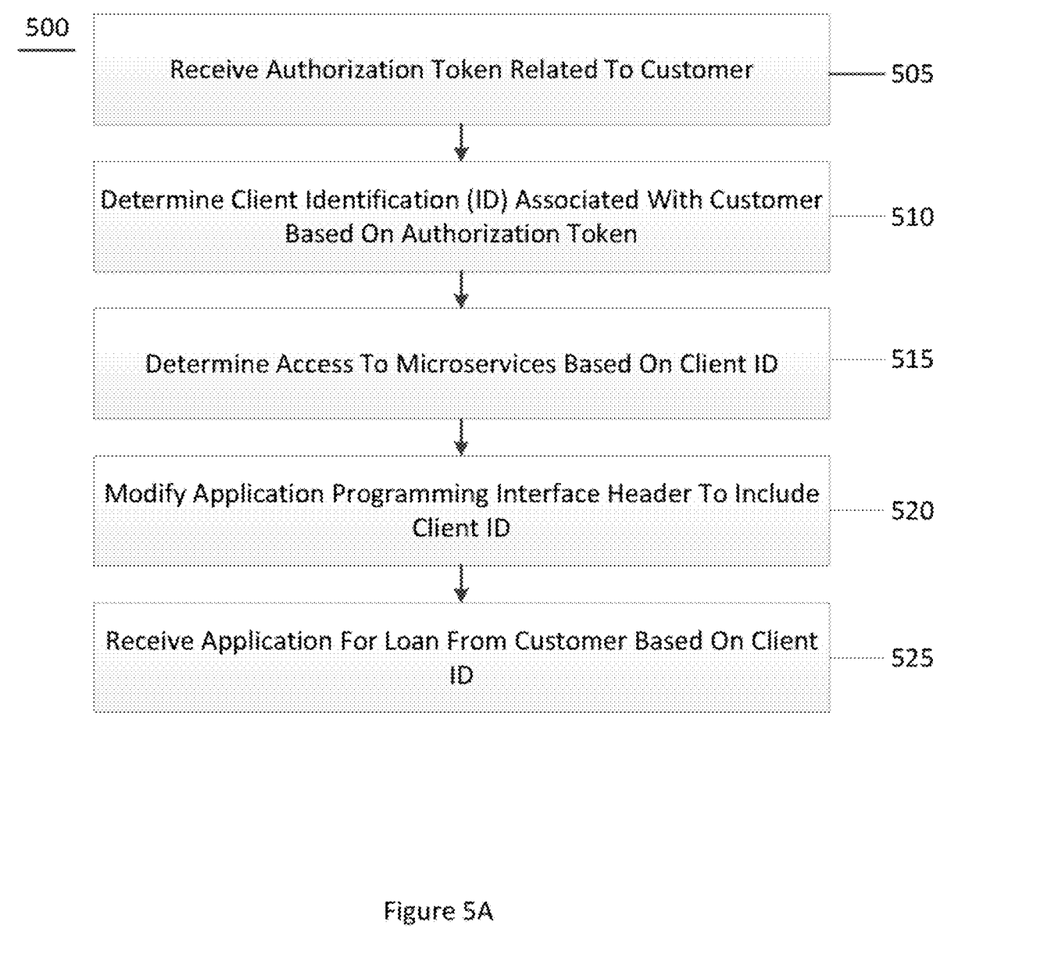
Figure 5B:
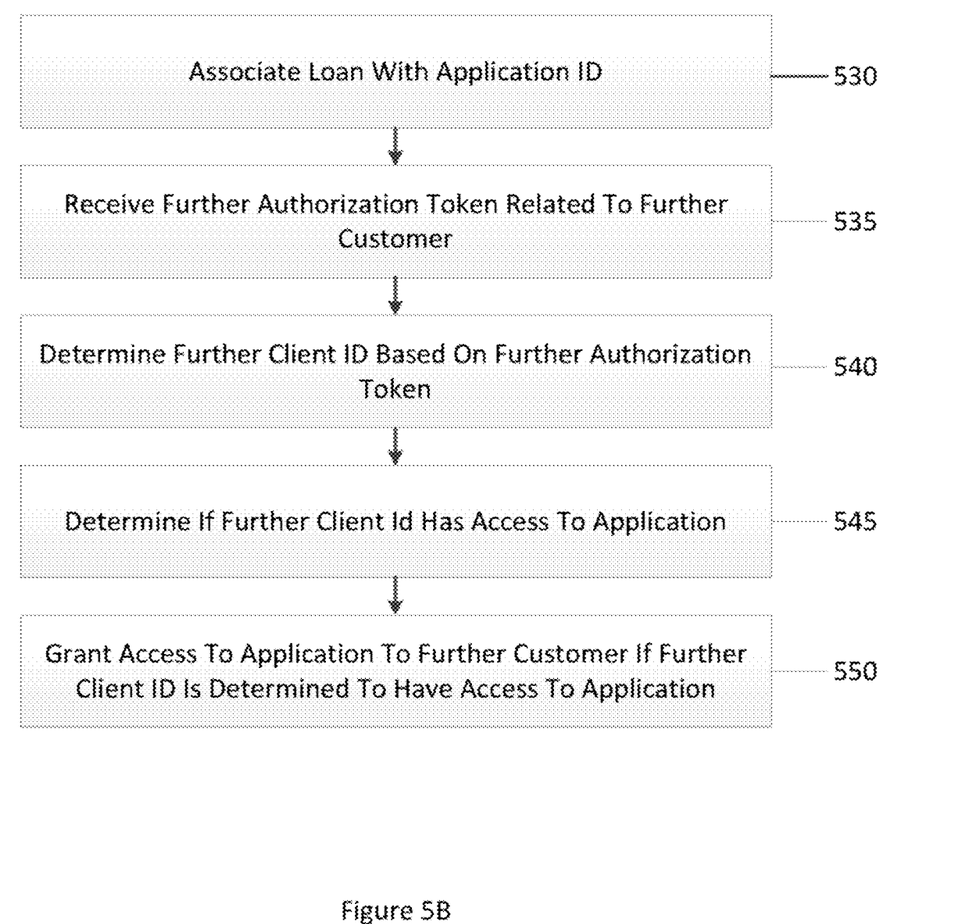

FIGS. 5A-7 are exemplary flow diagrams of methods 500, 600, and 700 according to an exemplary embodiment of the present disclosure. For example, as shown in FIGS. 5A and 5B, at procedure 505 an authorization token related to a customer can be received. At procedure 510, a client ID associated with the customer can be determined based on the authorization token. At procedure 515, access to the microservices can be determined based on the client ID. At procedure 520, an application programming interface header can be modified to include the client ID. At procedure 525, an application for a loan from the customer can be received based on the client ID. At procedure 530, the loan can be associated with an application ID. At procedure 535, a further authorization token related to a further customer can be received. At procedure 540, a further client ID can be determined based on the further authorization token. At procedure 545, a determination can be made as to whether the further client ID has access to the application. Finally, at procedure 550 access to the application can be granted to the further customer if the further client ID is determined to have access to the application.

Figure 6A:
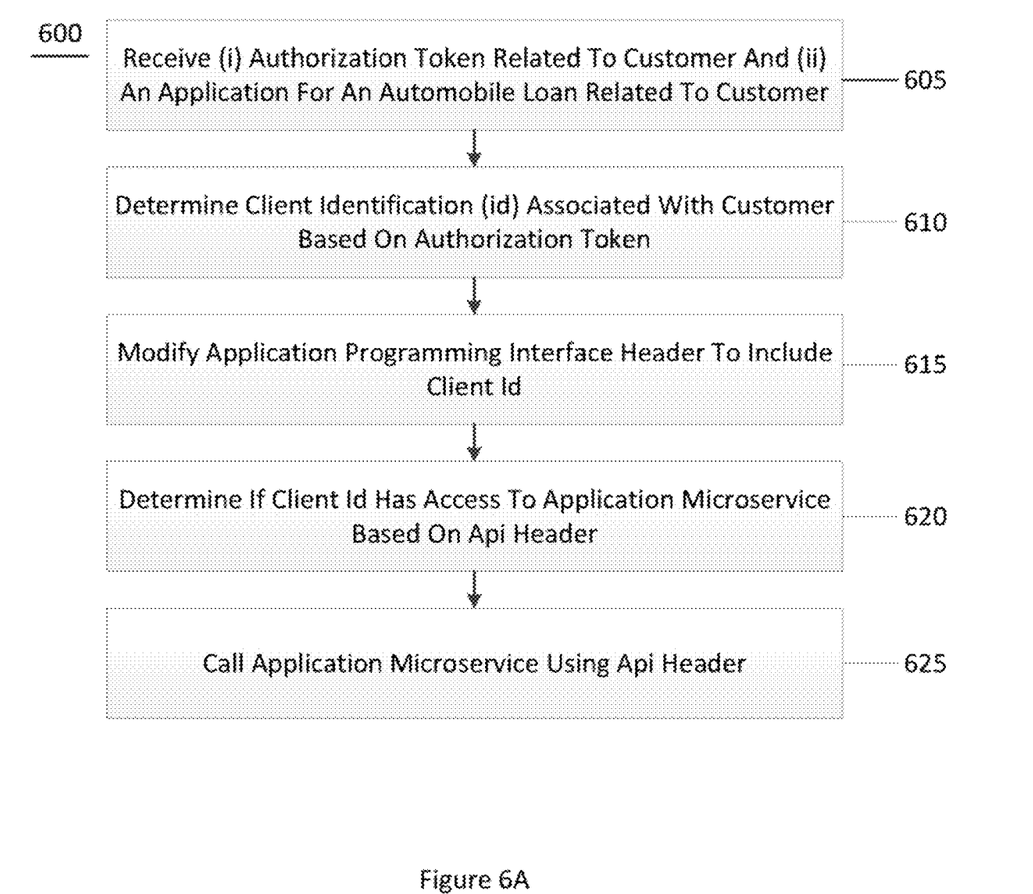
Figure 6B:
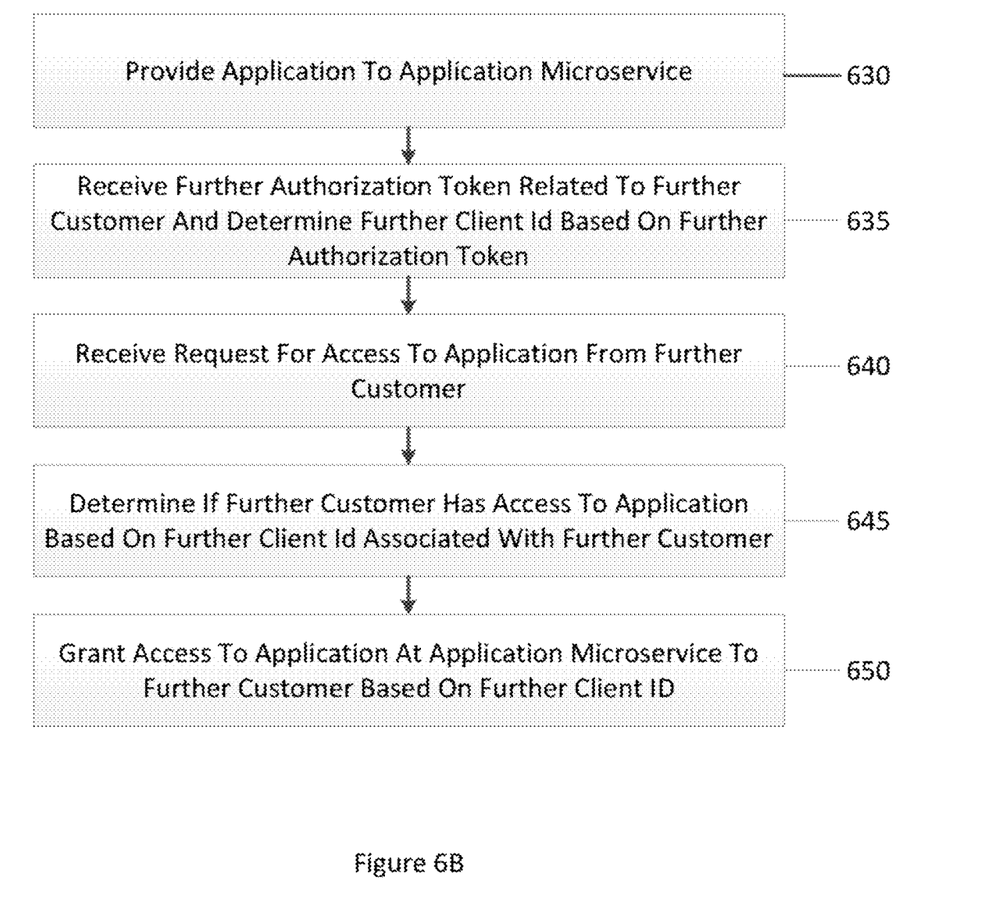

As shown in FIGS. 6A and 6B, at procedure 605, an authorization token related to a customer and an application for an automobile loan related to the customer can be received. At procedure 610, a client ID associated with the customer can be determined based on the authorization token. At procedure 615, and an API header can be modified to include the client ID. At procedure 620, a determination can be made as to whether the client ID has access to an application microservice based on the API header. At procedure 625, an application microservice can be called using the API header. At procedure 630, the application can be provided to the application microservice. At procedure 635, a further authorization token related to a further customer can be received and a determination can be made as to whether the further client ID has access based on the further authorization token. At procedure 640, a request for access to the application can be received from the further customer. At procedure 645, a determination can be made as to whether the further customer has access to the application based on the further client ID associated with the further customer. At procedure 650, access to the application at application microservice can be granted to the further customer based on the further client ID.

Figure 7:
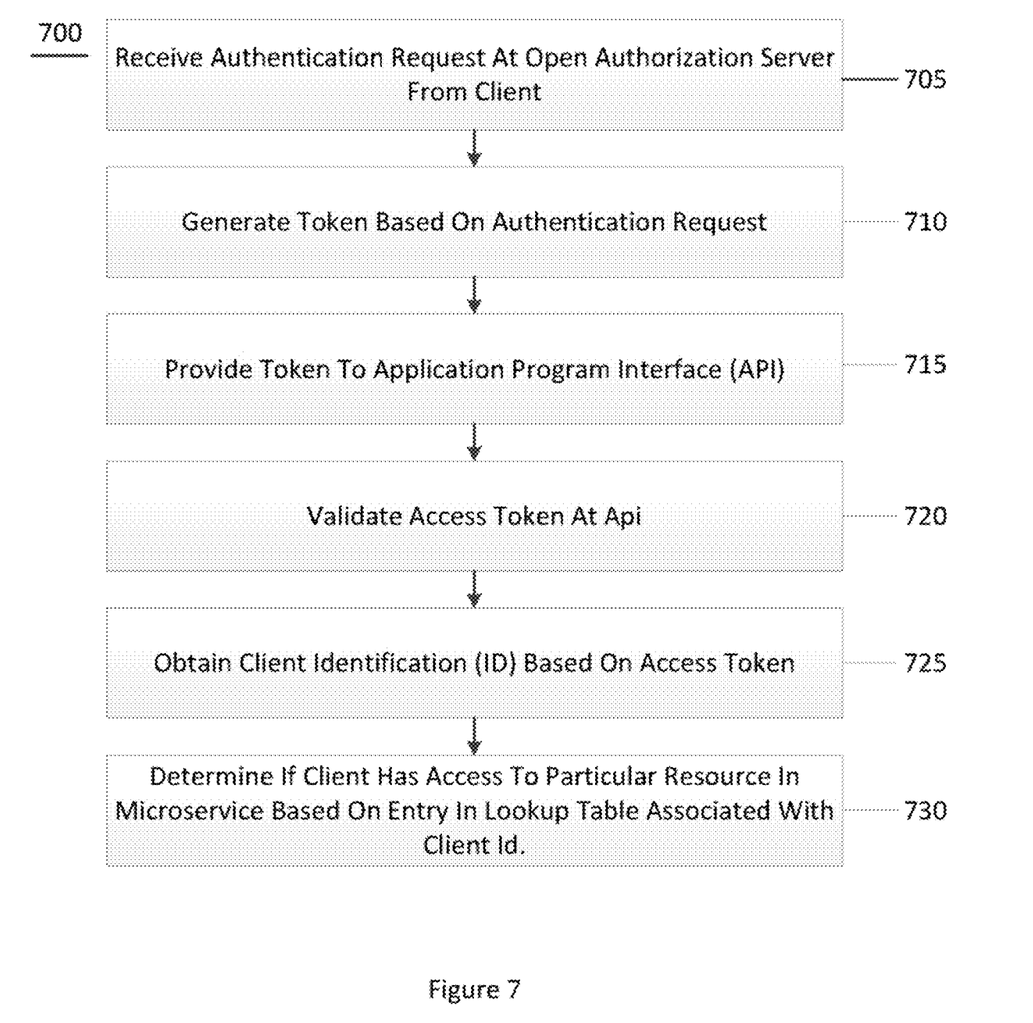

As shown in FIG. 7, at procedure 705, an authentication request can be received at an open authorization server from a client. At procedure 710, a token can be generated based on the authentication request. At procedure 715, a token can be provided to an API. At procedure 720, the access token can be validated at the API. At procedure 725, a client ID can be obtained based on the access token. At procedure 730, a determination can be made as to whether the client has access to a particular resource in the microservice based on an entry in a lookup table associated with client ID.

Figure 8:
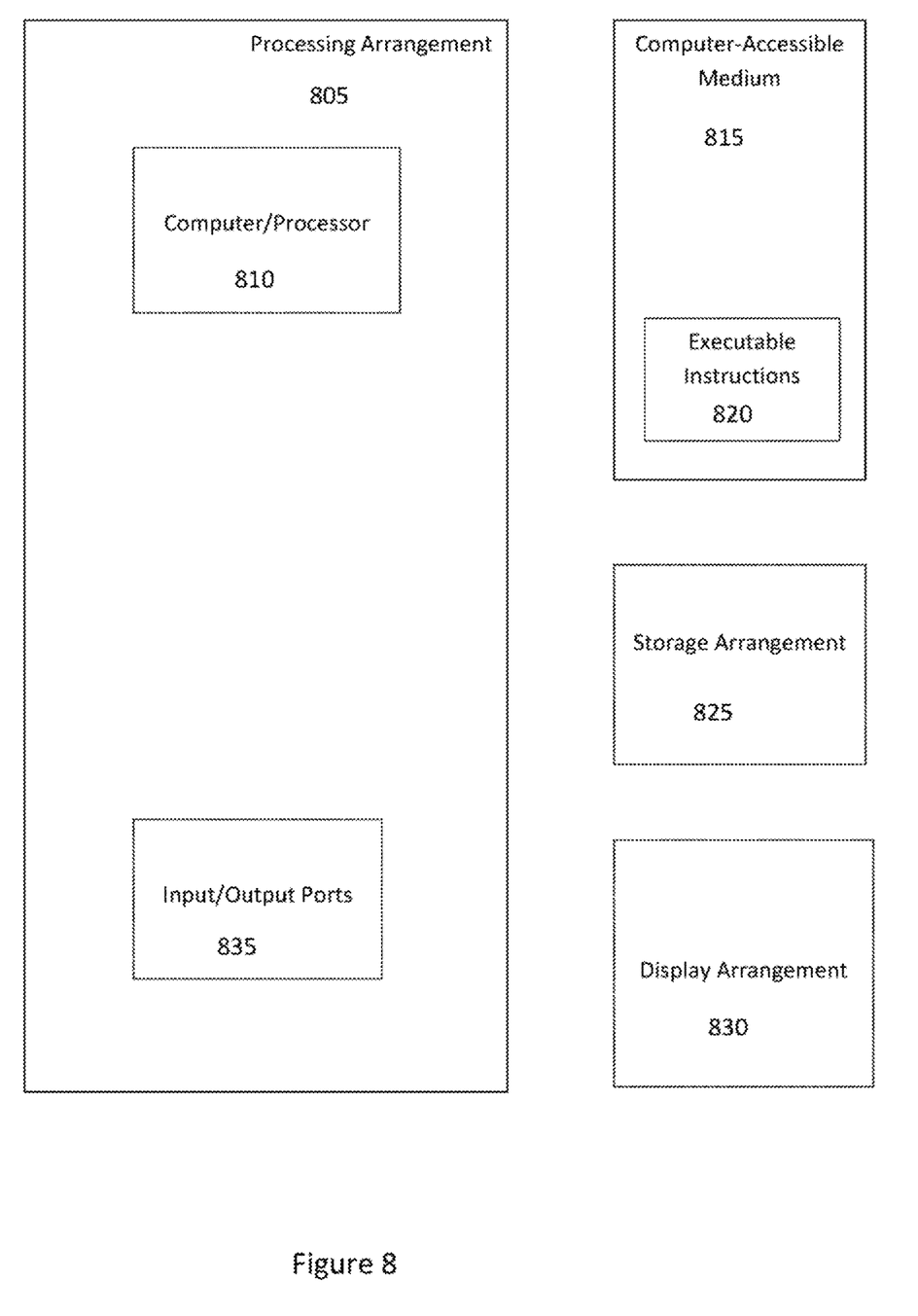
FIG. 8 is an illustration of an exemplary block diagram of an exemplary system in accordance with certain exemplary embodiments of the present disclosure.

FIG. 8 shows a block diagram of an exemplary embodiment of a system according to the present disclosure. For example, exemplary procedures in accordance with the present disclosure described herein can be performed by a processing arrangement and/or a computing arrangement (e.g., computer hardware arrangement) 805. Such processing/computing arrangement 805 can be, for example entirely or a part of, or include, but not limited to, a computer/processor 810 that can include, for example one or more microprocessors, and use instructions stored on a computer-accessible medium (e.g., RAM, ROM, hard drive, or other storage device).

As shown in FIG. 8, for example a computer-accessible medium 815 (e.g., as described herein above, a storage device such as a hard disk, floppy disk, memory stick, CD-ROM, RAM, ROM, etc., or a collection thereof) can be provided (e.g., in communication with the processing arrangement 805). The computer-accessible medium 815 can contain executable instructions 820 thereon. In addition or alternatively, a storage arrangement 825 can be provided separately from the computer-accessible medium 815, which can provide the instructions to the processing arrangement 805 so as to configure the processing arrangement to execute certain exemplary procedures, processes, and methods, as described herein above, for example.

Further, the exemplary processing arrangement 805 can be provided with or include an input/output ports 835, which can include, for example a wired network, a wireless network, the internet, an intranet, a data collection probe, a sensor, etc. As shown in FIG. 8, the exemplary processing arrangement 805 can be in communication with an exemplary display arrangement 830, which, according to certain exemplary embodiments of the present disclosure, can be a touch-screen configured for inputting information to the processing arrangement in addition to outputting information from the processing arrangement, for example. Further, the exemplary display arrangement 830 and/or a storage arrangement 825 can be used to display and/or store data in a user-accessible format and/or user-readable format.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A non-transitory computer-accessible medium having stored thereon computer-executable instructions, wherein, when a computer arrangement executes the instructions, the computer arrangement is configured to perform procedures comprising:

receiving, from an authorization server, an authorization token related to at least one customer, wherein the authorization token is associated with a request by at least one customer to access at least one microservice;

determining, using a validation server, a client identification (ID) associated with the at least one customer based on the authorization token, wherein the determining further comprises determining that the at least one customer is entitled to access the at least one microservice;

modifying an application programming interface (API) header associated with the request to include the client ID;

sending the API header, which includes the client ID, to the at least one microservice; and determining access to at least one resource accessible by at least one microservice based on the client ID and using a lookup table accessible by the at least one microservice.

2. The non-transitory computer-accessible medium of claim 1, wherein the at least one resource includes an application for at least one loan, and wherein the computer arrangement is further configured to:

receive the application for the at least one loan from the at least one customer based on the client ID; and associate the at least one loan with at least one application ID and the client ID.

3. The non-transitory computer-accessible medium of claim 2, wherein the computer arrangement is further configured to:

receive, from the authorization server, a further authorization token related to at least one further customer, wherein the further authorization token is associated with a further request by at the least one further customer to access the at least one microservice;

determine, using the validation server, a further client ID associated with the at least one further customer based on the further authorization token, wherein the determining further comprises determining that the at least one further customer is entitled to access the at least one microservice;

modify a further API header associated with the further request to include the further client ID;

send the further API header, which includes the further client ID, to the at least one micro service;

determine if the further client ID has access to the application based on the further client ID; and grant access to the application to the at least one further customer if the further client ID is determined to have access to the application.

4. The non-transitory computer-accessible medium of claim 3, wherein the computer arrangement is further configured to determine if the further client ID has access to the application based on the lookup table.

5. The non-transitory computer-accessible medium of claim 4, wherein the lookup table includes (i) a plurality of rows associated with a plurality of customers including the at least one customer and (ii) a plurality of columns with further resources available to each of the customers.

6. The non-transitory computer-accessible medium of claim 5, wherein the further resources include (i) creating an application, (ii) revising the application or (iii) checking a status of the application.

7. The non-transitory computer-accessible medium of claim 1, wherein the authorization server is an open authorization server.

8. The non-transitory computer-accessible medium of claim 1, wherein the at least one customer is an automobile dealer or a money lender.

9. The non-transitory computer-accessible medium of claim 1, wherein the at least one microservice includes at least one of (i) an applications microservice, (ii) an offers microservice, or (iii) a vehicle pricing microservice.

10. A non-transitory computer-accessible medium having stored thereon computer-executable instructions, wherein, when a computer arrangement executes the instructions, the computer arrangement is configured to perform procedures comprising:
   receiving, from an authorization server, an authorization token related to at least one customer, wherein the authorization token is associated with a request by at least one customer to access an application microservice;
   receiving an application for an automobile loan related to the at least one customer;
   determining, using a validation server, a client identification (ID) associated with the at least one customer based on the authorization token, wherein the determining further comprises determining that the at least one customer is entitled to access the application microservice
   modifying an application programming interface (API) header associated with the request to include the client ID;
   sending the API header, which includes the client ID, to the application microservice;
   determining access to at least one resource accessible by the application microservice based on the client ID and using a lookup table accessible by the application microservice;
   providing the application to the application microservice;
   receiving a request for access to the application from at least one further customer;
   determining if the at least one further customer has access to the application based on a further client ID associated with the at least one further customer; and
   granting access to the application at the application microservice to the at least one further customer based on the further client ID.

11. The non-transitory computer-accessible medium of claim 10, wherein the computer arrangement is further configured to receive from the authorization server, a further authorization token related to the at least one further customer and determine the further client ID, using the validation server, based on the further authorization token.

12. The non-transitory computer-accessible medium of claim 10, wherein the lookup table includes (i) a plurality of rows associated with a plurality of customers including the at least one customer and (ii) a plurality of columns with further resources available to each of the customers.

13. The non-transitory computer-accessible medium of claim 12, wherein the further resources include (i) creating an application, (ii) revising the application or (iii) checking a status of the application.

14. The non-transitory computer-accessible medium of claim 10, wherein the authorization server is an open authorization server.

15. The non-transitory computer-accessible medium of claim 10, wherein the computer arrangement is further configured to call the application microservice using the API header.

16. The non-transitory computer-accessible medium of claim 10, wherein the at least one customer is an automobile dealer or a money lender.

17. The non-transitory computer-accessible medium of claim 10, wherein the computer arrangement is configured to determine if the at least one further customer has access to the application by determining if an entry in a lookup table includes information regarding the at least one further customer.

18. A non-transitory computer-accessible medium having stored thereon computer-executable instructions, wherein, when a computer arrangement executes the instructions, the computer arrangement is configured to perform procedures comprising:
   receiving an authentication request at an open authorization server from a client;
   generating a token based on the authentication request;
   providing the token to an application program interface (API), wherein the token is associated with a request by at least one customer to access a particular resource accessible by at least one microservice;
   validating the access token at the API using a validation server;
   obtaining a client identification (ID) based on the validation of the access token;
   modifying an API header associated with the request to include the client ID;
   sending the API header, which includes the client ID, to the at least one microservice; and
   determining if the client has access to the particular resource at the at least one in microservice based on an entry in a lookup table associated with the client ID that is accessible by the at least one microservice.

* * * * *